United States Patent
Kondo et al.

(10) Patent No.: US 9,857,268 B2
(45) Date of Patent: Jan. 2, 2018

(54) REMOTE ASSISTANT SYSTEM AND METHOD THEREFOR

(71) Applicant: SINTOKOGIO, LTD., Toyokawa-shi, Aichi (JP)

(72) Inventors: Minoru Kondo, Toyokawa (JP); Kazuhisa Senoo, Toyokawa (JP); Kouichi Kusano, Toyokawa (JP)

(73) Assignee: SINTOKOGIO, LTD., Nagdya-Shi, Aichi (JP)

( * ) Notice: Subject to any disclaimer, the term of this patent is extended or adjusted under 35 U.S.C. 154(b) by 276 days.

(21) Appl. No.: 14/665,631

(22) Filed: Mar. 23, 2015

(65) Prior Publication Data
US 2015/0247783 A1    Sep. 3, 2015

Related U.S. Application Data

(63) Continuation of application No. PCT/JP2014/082379, filed on Dec. 8, 2014.

(30) Foreign Application Priority Data

Mar. 3, 2014 (JP) .................................. 2014-041064

(51) Int. Cl.
G01H 11/06    (2006.01)
G01H 1/00    (2006.01)
(Continued)

(52) U.S. Cl.
CPC .............. *G01M 7/00* (2013.01); *G05B 19/02* (2013.01); *G01H 1/003* (2013.01); *G01H 11/06* (2013.01);
(Continued)

(58) Field of Classification Search
CPC ...... G01H 1/003; G01H 17/00; G01M 3/0451
(Continued)

(56) References Cited

U.S. PATENT DOCUMENTS 4,237,454 A * 12/1980 Meyer .................... G01H 1/003
310/323.21
5,442,961 A    8/1995 Bozeman, Jr.
(Continued)

FOREIGN PATENT DOCUMENTS

JP    57-076419 A    5/1982
JP    02-008716 A    1/1990
(Continued)

OTHER PUBLICATIONS

PCT Search Report and Written Opinion dated Feb. 24, 2015 which was issued in a related PCT International Patent Application No. PCT/JP2014/082379 (10 pages).

*Primary Examiner* — Gregory J Toatley
*Assistant Examiner* — Michael Dalbo
(74) *Attorney, Agent, or Firm* — Robert P. Michal, Esq.; Carter, DeLuca, Farrell & Schmidt, LLP

(57) ABSTRACT

A remote assistant system capable of measuring a vibration velocity and then determining whether or not warning is required includes a vibration sensor unit which measures a vibration velocity, while transmitting information of a measured value of the measurement every ten minutes. A cloud server receives and saves the information of the measured value, while employing as an effective velocity value only a measured value within a range between an effective upper-limit velocity value and an effective lower-limit velocity value. Then, when a latest moving average value calculated by use of a latest effective velocity value and a saved effective velocity value exceeds a velocity threshold previously set as an upper limit for a vibration velocity in a case not requiring inspection, the cloud server transmits a warning e-mail to that effect to a previously set e-mail address.

12 Claims, 8 Drawing Sheets

(51) Int. Cl.
    *G01M 13/04*     (2006.01)
    *G01M 13/02*     (2006.01)
    *G01M 15/12*     (2006.01)
    *G01M 7/00*     (2006.01)
    *G05B 19/02*     (2006.01)

(52) U.S. Cl.
    CPC ........ *G01M 13/028* (2013.01); *G01M 13/045* (2013.01); *G01M 15/12* (2013.01)

(58) Field of Classification Search
    USPC .......................................................... 702/56
    See application file for complete search history.

(56) References Cited

U.S. PATENT DOCUMENTS

| | | | | |
|---|---|---|---|---|
| 6,484,109 | B1* | 11/2002 | Lofall | .................... G01H 1/003 |
| | | | | 702/56 |
| 6,598,479 | B1* | 7/2003 | Robinson | ................ G01H 11/06 |
| | | | | 73/658 |
| 2007/0259766 | A1* | 11/2007 | Jackson | .................... B08B 3/06 |
| | | | | 494/36 |
| 2008/0027681 | A1* | 1/2008 | Nicastro | ............ G05B 23/0283 |
| | | | | 702/184 |
| 2009/0030545 | A1* | 1/2009 | Masuya | ................. B23Q 17/12 |
| | | | | 700/175 |
| 2010/0274435 | A1* | 10/2010 | Kondoh | ................ B60W 40/09 |
| | | | | 701/31.4 |

FOREIGN PATENT DOCUMENTS

| | | |
|---|---|---|
| JP | 02-298825 A | 12/1990 |
| JP | 10-176950 A | 6/1998 |
| JP | 2002-287818 A | 10/2002 |
| JP | 2003-085680 A | 3/2003 |
| JP | 2006-150564 | 6/2006 |
| JP | 2012-048303 A | 3/2012 |
| JP | 2013-029484 A | 2/2013 |

* cited by examiner

REMOTE ASSISTANT SYSTEM AND METHOD THEREFOR

CROSS REFERENCE TO RELATED APPLICATIONS

This application is a Continuation of PCT International Patent Application No. PCT/JP2014/082379 filed on Dec. 8, 2014, which claims the benefit of Japanese Patent Application No. 2014-041064 filed Mar. 3, 2014, the entire disclosure of each of which is incorporated herein by reference in its entirety.

FIELD OF THE INVENTION

The present invention relates to a remote assistant system, and a method therefor.

BACKGROUND INFORMATION

As a remote system, there is, for example, one that monitors facilities and also transmits information regarding abnormality of the facilities by e-mail. For example, in a remote monitoring system disclosed in Patent Document 1 below, a monitoring module acquires information of a monitoring item such as a temperature in facilities to be monitored, and when the monitoring item or the like exceeds or falls below a certain reference value, an e-mail transmission module transmits information regarding the abnormality of the facilities by e-mail.

CITATION LIST

Patent Document

Patent Document 1: Japanese Patent Laid-Open No. 2003-85680

SUMMARY

Technical Problem

However, in the mechanism to determine whether there is an abnormality or not based on a value of one measurement, an overall trend change in measured value is not determined, and even though a composite element such as a vibration velocity is reflected to the measured value, it may not be suitable for the determination.

On the other hand, when an attempt is made to add a variety of measurement items, on top of the measured value of the vibration velocity, with all (or most of) the composite elements taken into consideration and also make a general determination, the timing for notifying warning to a customer or the like is delayed.

In view of the above fact, an object of one embodiment of the present invention is to provide a remote assistant system capable of measuring a vibration velocity and then determining whether or not a warning is required, so as to notify a warning to a customer or the like at an appropriate timing. With regard to maintenance activities for facilities, the maintenance activities have hitherto relied on experienced operators, but the number of such talented people is recently declining. Hence automation and an unmanned operation have been required except in an actual maintenance operation, and the present invention also meets this requirement (unmanned system by e-mail automatic distribution).

Solution to Problem

A remote assistant system of one embodiment of the present invention includes: a vibration sensor unit which is fixed to a device to be monitored or a periphery thereof and measures a vibration velocity, while transmitting information of a measured value of the measurement at least a plurality of times in one hour at predetermined time intervals; and a server which receives and saves the information of the measured value transmitted from the vibration sensor unit, while employing as an effective velocity value only a measured value within a range between an effective upper-limit velocity value and an effective lower-limit velocity value previously set as a velocity range of vibration caused by operation of the device, and transmits a warning e-mail to a previously set e-mail address when the latest moving average value calculated by use of the latest effective velocity value and a saved effective velocity value exceeds a velocity threshold previously set as an upper limit for a vibration velocity in a case not requiring inspection, the warning e-mail being transmitted to that effect.

According to the above configuration, a vibration sensor unit fixed to a device to be monitored or a periphery thereof measures a vibration velocity, while transmitting information of a measured value of the measurement at least a plurality of times in one hour at predetermined time intervals. In contrast, a server receives and saves the information of the measured value transmitted from the vibration sensor unit, while employing as an effective velocity value only a measured value within a range between an effective upper-limit velocity value and an effective lower-limit velocity value previously set as a velocity range of vibration caused by operation of the device. Then, when the latest moving average value calculated by use of the latest effective velocity value and a saved effective velocity value exceeds a velocity threshold previously set as an upper limit for a vibration velocity in the case not requiring inspection, the server transmits a warning e-mail to that effect to a previously set e-mail address. In such a manner, the vibration velocity is measured at least a plurality of times in one hour while an overall trend change is rapidly determined from only those measured values, thereby allowing transmission of a warning e-mail at appropriate timing.

This application is based on Japanese Patent Application No. 2014-041064 filed in Japan on Mar. 3, 2014, the entirety of which is incorporated by reference herein.

Further, embodiments of the present invention may be able to be thoroughly understood by means of the following detailed description. However, the detailed description and specific example are a preferable embodiment of the present invention, and are mentioned only for the purpose of description. This is because, from this detailed description, a variety of changes and modifications are obvious for a person skilled in the art.

The applicant does not intend to present any of the mentioned embodiments to the public, and out of the disclosed modification and alternatives, one that might not be included within the claims by wording is regarded as part of the invention under the doctrine of equivalents.

In descriptions of the present specification or the claims, the use of a noun and a similar directive should be interpreted as including both a singular and a plural unless otherwise directed or clearly denied by a context. Any of exemplification or exemplary terms (for example, "etc.") provided in the present specification is also simply intended to facilitate description of embodiments of the present invention, and does not restrict the scope of the present invention unless specifically mentioned in the claims.

BRIEF DESCRIPTION OF THE DRAWINGS

FIG. 6(A) shows an example before part replacement, and FIG. 6(B) shows an example after part replacement.

DETAILED DESCRIPTION

Figure 1:
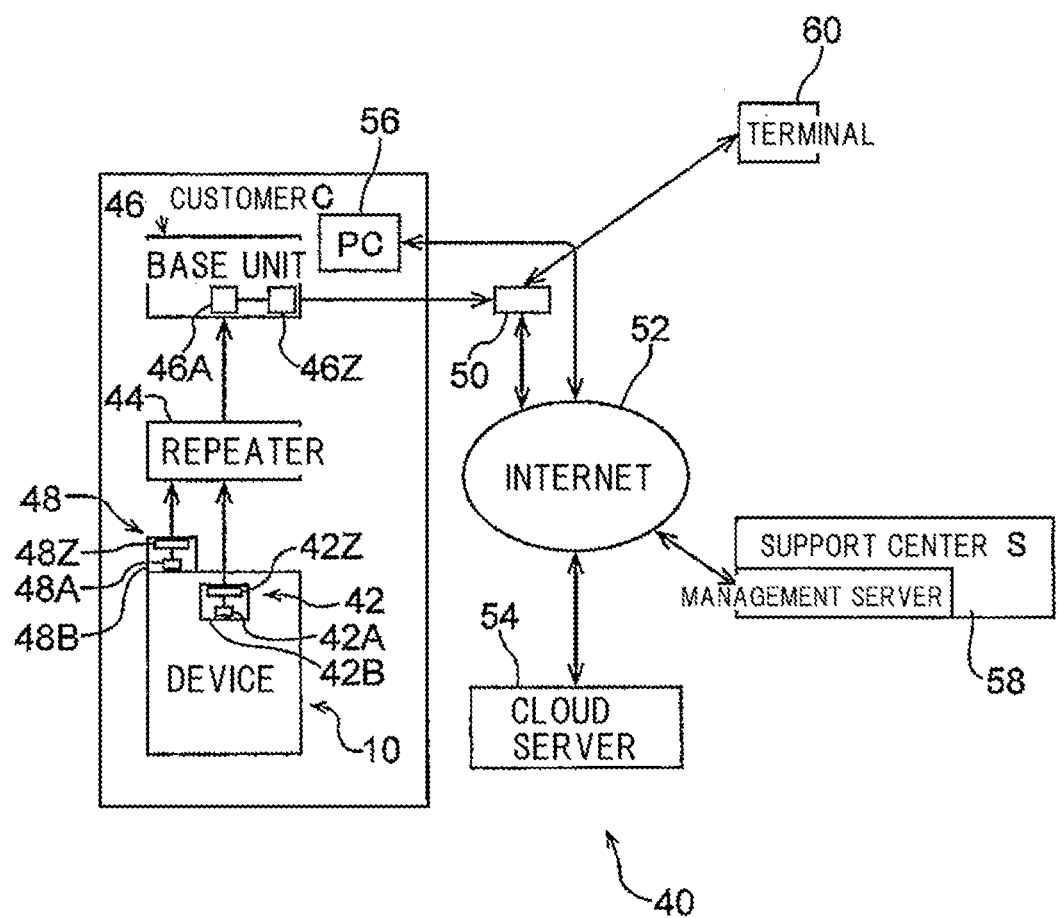
FIG. 1 is a block diagram showing a remote assistant system according to one embodiment of the present invention.
Figure 2:
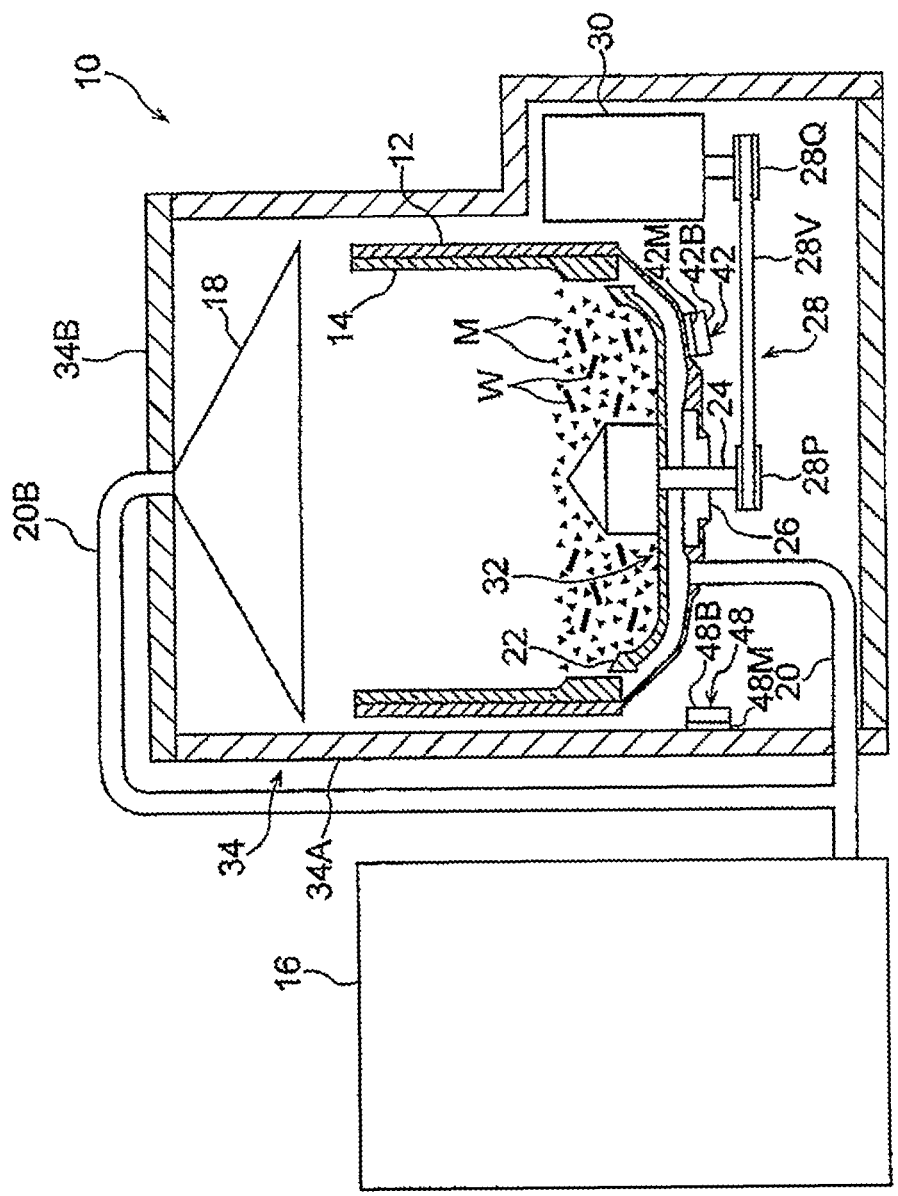
FIG. 2 is a schematic constitutional view showing a sensor unit of the remote assistant system of FIG. 1, and a barrel polishing device to be monitored.

A remote assistant system according to one embodiment of the present invention will be described using FIGS. 1 to 8. FIG. 1 shows by means of a block diagram a remote assistant system 40 according to the present embodiment. Further, FIG. 2 shows by means of a schematic constitutional view a sensor unit (vibration sensor unit 42, noise sensor unit 48) of the remote assistant system 40 (cf. FIG. 1) and a barrel polishing device 10 as a device to be monitored.

(Brief Description of Barrel Polishing Device)

First, the barrel polishing device 10 that is to be monitored in the present embodiment will be briefly described. As shown in FIG. 2, the barrel polishing device 10 is provided with a barrel container 12 as a polishing container. The barrel container 12 is formed in a container shape, and fixed to a pedestal (not shown). A lining 14 is made to adhere to the inner surface of the barrel container 12. A media M, a workpiece W and the like (these are collectively referred to as a "mass") are mounted into this barrel container 12. It is to be noted that the media M and the workpiece W are schematically shown in the figure.

One end of a dust collection hose 20 is coupled to the bottom of the barrel container 12. The other end of the dust collection hose 20 is coupled to an inhalation section side of a dust collection machine 16. The dust collection machine 16 is provided with a fan (not shown) that inhales air in the dust collection hose 20, and is also provided with a filter (not shown) for preventing dust from being discharged.

A dust collection hood 18 is arranged above the barrel container 12. One end of a dust collection hose 20B is coupled to the dust collection hood 18. The other end of the dust collection hose 20B is connected to the other end side of the dust collection hose 20.

Meanwhile, a rotary table 22 is arranged on the upper surface side of the bottom of the barrel container 12. The rotary table 22, whose center is taken as a shaft fitting section, is fixed to a rotary shaft 24. Further, bearings 26 are provided on the bottom of the barrel container 12, and the rotary shaft 24 fixed to the rotary table 22 is rotatably pivotally supported by the bearings 26 of the barrel container 12. The lower end of the rotary shaft 24 is connected to a drive force transmission mechanism 28 below the bottom of the barrel container 12.

The drive force transmission mechanism 28 is configured by including a pair of pulleys 28P, 28Q, and a V-belt 28V wound around the pair of pulleys 28P, 28Q. The rotary shaft 24 described above is made to coaxially adhere to a shaft center section of the one pulley 28P. Further, an output shaft of a motor 30 with a velocity reducer is made to coaxially adhere to a shaft center section of the other pulley 28Q.

As above, in the barrel polishing device 10, the mass is allowed to flow in the barrel container 12 by rotation of the rotary table 22 driven by the motor 30. That is, in the present embodiment, a flowing mechanism 32, which serves to allow flowing of the media M and the workpiece W mounted into the barrel container 12, is configured by including the motor 30, the drive force transmission mechanism 28, the rotary shaft 24, the bearings 26 and the rotary table 22.

Further, the barrel polishing device 10 is provided with a housing 34 where the barrel container 12 is housed. The housing 34 is provided separately from the outer surface of the barrel container 12, and includes a vertical wall section 34A arranged to the side of the barrel container 12, and an upper wall section 34B arranged above the barrel container 12.

(Configuration of Remote Assistant System)

Meanwhile, the vibration sensor unit 42 in a box shape is fixed to the outer surface of the barrel container 12 in the barrel polishing device 10. That is, the vibration sensor unit 42 is provided with a casing 42B and a magnet 42M (simplified and shown in the figure) fitted to the outer surface of the casing 42B, and is detachably fixed to the outer surface of the barrel container 12 by the magnet 42M. This can facilitate the vibration sensor unit 42 to be attached to and detached from the outer surface of the barrel container 12. It is to be noted that this vibration sensor unit 42 can be detachably fixed for general use to another device (e.g., dust collection machine 16, shot blaster, etc.) or a periphery thereof by magnetic force of the magnet 42M so long as the device or the periphery thereof is an object which the magnet 42M can absorb.

As shown in FIG. 1, the vibration sensor unit 42 is provided with a vibration velocity sensor 42A that measures a vibration velocity, and is also provided with a transmitter 42Z that transmits information of a measured value measured in the vibration velocity sensor 42A. The vibration velocity sensor 42A and the transmitter 42Z are connected to a battery, not shown, in the box of the vibration sensor unit 42. Since the vibration sensor unit 42 (vibration velocity sensor 42A) is fixed to the outer surface of the barrel container 12 shown in FIG. 2, it can favorably measure a velocity of vibration generated due to operation of the flowing mechanism 32. The transmitter 42Z shown in FIG. 1 can wirelessly transmit information of a measured value measured in the vibration velocity sensor 42A to a base unit 46 (receiver 46A) via a repeater 44, and is set so as to transmit the information of the measured value at least a plurality of times in one hour at predetermined time intervals (six times in one hour at intervals of 10 minutes as one example in the present embodiment). It should be noted that the vibration sensor unit 42 also transmits positional information from the transmitter 42Z along with the information of the measured value described above.

Further, as shown in FIG. 2, in the barrel polishing device 10, the noise sensor unit 48 in a box shape is fixed to the vertical wall section 34A of the housing 34. That is, the noise sensor unit 48 is provided with a casing 48B and a magnet section 48M (simplified and shown in the figure) fitted to the outer surface of the casing 48B, and is detachably fixed to the vertical wall section 34A of the housing 34 by the magnet section 48M. This can facilitate the noise sensor unit 48 to be attached to and detached from the vertical wall section 34A of the housing 34. It is to be noted that this noise sensor unit 48 can be detachably fixed for general use to another device (e.g., dust collection machine 16, shot blaster, etc.) or a periphery thereof by magnetic force of the magnet section 48M so long as the device or the periphery thereof is an object which the magnet 48M can absorb.

As shown in FIG. 1, the noise sensor unit 48 is provided with a noise sensor 48A that measures noise, and is also provided with a transmitter 48Z that transmits information of a measured value measured in the noise sensor 48A. The noise sensor 48A and the transmitter 48Z are connected to a battery, not shown, in the box of the noise sensor unit 48. In the position of the outer surface of the barrel container 12 shown in FIG. 2, a case may occur where noise is so large that a noise value cannot be measured, but in the position of the housing 34, such a case basically does not occur, and hence the noise sensor 48A (cf. FIG. 1) of the noise sensor unit 48 can favorably measure noise generated due to operation of the flowing mechanism 32. The transmitter 48Z shown in FIG. 1 can wirelessly transmit information of a measured value measured in the noise sensor 48A to a base unit 46 (receiver 46A) via the repeater 44, and is set so as to transmit the information of the measured value at least a plurality of times in one hour at predetermined time intervals (six times in one hour at intervals of 10 minutes as one example in the present embodiment). It should be noted that the noise sensor unit 48 also transmits positional information from the transmitter 48Z along with the information of the measured value described above.

As above, the receiver 46A of the base unit 46 receives the information of the vibration velocity value transmitted from the vibration sensor unit 42, while receiving the information of the noise value transmitted from the noise sensor unit 48. The base unit 46 and the repeater 44 are installed in a customer C where the barrel polishing device 10 is installed. It is to be noted that, when a distance between the vibration sensor unit 42 and the base unit 46 is short, the repeater 44 may not be present therebetween, and when a distance between the noise sensor unit 48 and the base unit 46 is short, the repeater 44 may not be present therebetween.

The base unit 46 is provided with a conversion transmitter 46Z. The conversion transmitter 46Z is a communication apparatus for transmitting information received in the receiver 46A to a radio base station 50 in a wireless network (not shown). Further, the radio base station 50 is connected to an internet 52 (communication line network), and the internet 52 is connected with a cloud server 54 as a server. The cloud server 54 then receives the information of the measured value and the positional information transmitted from the vibration sensor unit 42, as well as the information of the measured value and the positional information transmitted from the noise sensor unit 48, from the base unit 46 via the radio base station 50 and the internet 52, and saves the received information into a DB. It should be noted that processing by the cloud server 54 will be described in detail later.

Further, a personal computer 56 of the customer C and a management server 58 of a support center S are connected to the internet 52. The support center S is an institution for supporting a site installed with the barrel polishing device 10. It is to be noted that the management server 58 of the support center S may be one directly connected to the internet 52 or may be one connected to the internet 52 via an intracompany network (not shown) in the support center S.

Further, a portable terminal 60 of a person in charge of sales for supporting the customer C can perform transmission and reception to and from the a radio base station 50. In addition, it may be configured such that a personal computer of the person in charge of sales for supporting the customer C is connected to the internet 52 in place of the portable terminal 60 as above.

With such a configuration, the information of the measured value stored in the DB of the cloud server 54 is accessible from the personal computer 56 of the customer C via the internet 52, while being also accessible from the portable terminal 60 of the person in charge of sales via the internet 52 and the radio base station 50. This allows browsing of the measurement information from the personal computer 56 of the customer C and the portable terminal 60 of the person in charge of sales. In other words, in accordance with an access from the user's computer, the cloud server 54 provides the information of the vibration velocity, the information of the noise and the positional information of measurement positions of those, which are saved therein.

It is to be noted that the cloud server 54 automatically generates the information of the vibration velocity and the information of the noise, which are saved therein, into the shape of a report in each predetermined cycle (e.g., every month), and displays them on a web screen in a website managed by the cloud server 54. Further, on the web screen in the website managed by the cloud server 54, each piece of information of the vibration velocity and the noise is displayed in each corresponding measurement position on a map.

(Processing by Cloud Server)

Next, the processing by the cloud server 54 will be described in detail. It is to be noted that in a storage section, not shown, of the cloud server 54, there is stored application software including a logic of a variety of processing flows that will be described hereinafter.

The cloud server 54 is previously set with an e-mail address of a destination of an automatically transmitted e-mail with respect to each device to be monitored (barrel polishing device 10 in FIG. 1). The previously set e-mail addresses corresponding to the barrel polishing device 10 are an e-mail address of the customer C, an e-mail address of the person in charge of sales who owns the portable terminal 60 and an e-mail address of the support center S.

Figure 3:
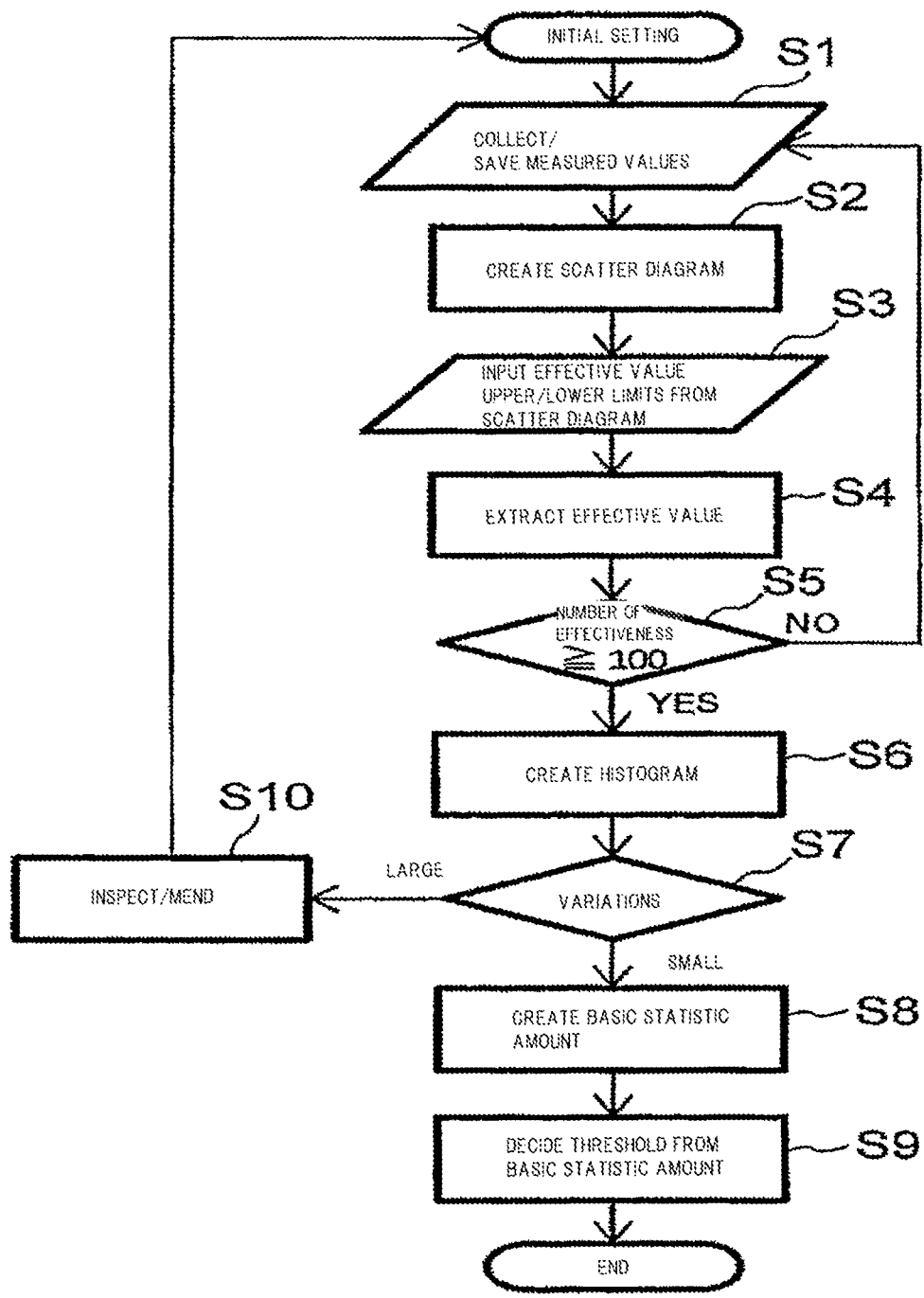
FIG. 3 is a flowchart showing a processing flow before start of monitoring in the remote assistant system of FIG. 1.

The cloud server 54 transmits a warning e-mail (e-mail) to the previously set e-mail address when a predetermined moving average value, described later, exceeds a threshold (management value). FIG. 3 shows a processing flow at the time of deciding this threshold. The processing shown in this FIG. 3 is pre-processing before start of formal monitoring. Hereinafter, a description will be given in the order of a decision flow for a velocity threshold and a decision flow for a noise threshold. It should be noted that the velocity threshold is a threshold previously set as an upper limit for a vibration velocity in the case not requiring inspection, and the noise threshold is a threshold previously set as an upper limit for noise in the case not requiring inspection.

In the case of deciding the velocity threshold, as shown in FIG. 3, first, measured values of the vibration velocity are collected (data is received) and saved (S1). Next, a scatter diagram is created based on the saved data (S2). Subsequently, a person in charge of management decides an effective upper-limit velocity value and an effective lower-limit velocity value previously set as a velocity range of vibration caused by operation of the device (barrel polishing device 10 (cf. FIG. 2)) from the scatter diagram, and inputs the effective upper-limit velocity value and the effective lower-limit velocity value from an input screen of the application software on the cloud server 54 (cf. FIG. 1) (S3). The cloud server 54 then employs only a measured value within the range between the effective upper-limit velocity value and the effective lower-limit velocity value as an effective velocity value (S4). Such an effective range of the measured value, namely the range by the effective upper limit and the effective lower limit, is a condition for extracting a data group caused by the object out of data measured in the sensor unit and establishing a dynamic trend. Here, the effective range of the measured value is provided in order to automatically extract this data group.

The cloud server 54 then determines whether or not the number of effectiveness employed (the number of pieces of data of effective velocity values) is not smaller than 100 (S5). When the number of effectiveness is smaller than 100, the processing returns to the step of collecting and saving measured values (S1). Further, when the number of effectiveness is not smaller than 100, the cloud server 54 creates a histogram (S6).

Next, the cloud server 54 determines whether or not variations in effective velocity value are large ones that exceed a previously expected amount of variations (S7), and when the variations are large ones exceeding the previously expected amount of variations, the cloud server 54 and/or the person in charge of management perform inspection and mending (S10), and return to the initial setting (S0) to resume the processing. Further, when the variations in effective velocity value are small ones not exceeding the previously expected amount of variations, the cloud server 54 creates a basic statistic amount (S8). It is to be noted that, although an illustration by means of a flow is omitted, in a case where the histogram has a plurality of peaks even when the variations in effective velocity value are small ones not exceeding the previously expected amount of variations, the cloud server 54 and/or the person in charge of management check an operation process by way of precaution.

Finally, the velocity threshold is decided by the cloud server 54 and/or the person in charge of management from the basic statistic amount. The velocity threshold is a value of an average value $+3\sigma$ as one example. The value of the average value $+3\sigma$ serves as a standard for inspection and replacement of an expendable part (V-belt 28V (cf. FIG. 2)).

Further, in the present embodiment, on top of the velocity threshold, a management value of the vibration velocity is set by a larger value than the velocity threshold and in accordance with an inspection level of the barrel polishing device 10 (cf. FIG. 2). The inspection level is a level on which inspection is to be performed. In the present embodiment, in accordance with a moderate inspection level, specifically a level on which inspection (or replacement in some cases) of a regular replacement part (e.g., motor) is required, a first management value of the vibration velocity is set, and this first management value of the vibration velocity is set to a value of an average value $+6\sigma$. Further, in accordance with a large inspection level, specifically a level on which diagnosis and an overhaul of the entire device are required, a second management value of the vibration velocity is set, and this second management value of the vibration velocity is set to a value of an average value $+12\sigma$.

Meanwhile, also in the case of deciding the noise threshold, it is decided by a similar way of thinking to in the case of deciding the velocity threshold. To describe it briefly while using FIG. 3, first, measured values of the noise are collected (data is received) and saved (S1). Next, a scatter diagram is created based on the saved data (S2). Subsequently, the person in charge of management decides an effective noise upper limit and an effective noise lower limit previously set as a range of noise caused by operation of the device (barrel polishing device 10 (cf. FIG. 2)) from the scatter diagram, and inputs the effective noise upper limit and the effective noise lower limit from the input screen of the application software on the cloud server 54 (cf. FIG. 1) (S3). The cloud server 54 then employs only a measured value within the range between the effective noise upper limit and the effective noise lower limit as an effective noise value (S4).

The cloud server 54 then determines whether or not the number of effectiveness employed (the number of pieces of data of effective noise values) is not smaller than 100 (S5). When the number of effectiveness is smaller than 100, the processing returns to the step of collecting and saving measured values (S1). Further, when the number of effectiveness is not smaller than 100, the cloud server 54 creates a histogram (S6).

Next, the cloud server 54 determines whether or not variations in effective noise value are large ones that exceed a previously expected amount of variations (S7), and when the variations are large ones exceeding the previously expected amount of variations, the cloud server 54 and/or the person in charge of management perform inspection and mending (S10), and return to the initial setting (S0) to resume the processing. Further, when the variations in effective noise value are small ones not exceeding the previously expected amount of variations, a basic statistic amount is created (S8). It is to be noted that, although an illustration by means of a flow is omitted, in a case where the histogram has a plurality of peaks even when the variations in effective noise value are small ones not exceeding the previously expected amount of variations, the cloud server 54 and/or the person in charge of management check an operation process by way of precaution.

Finally, the noise threshold is decided by the cloud server 54 and/or the person in charge of management from the basic statistic amount. The noise threshold is a value of an average value $+3\sigma$ as one example. The value of the average value $+3\sigma$ serves as a standard for inspection and replacement of an expendable part.

Figure 4:
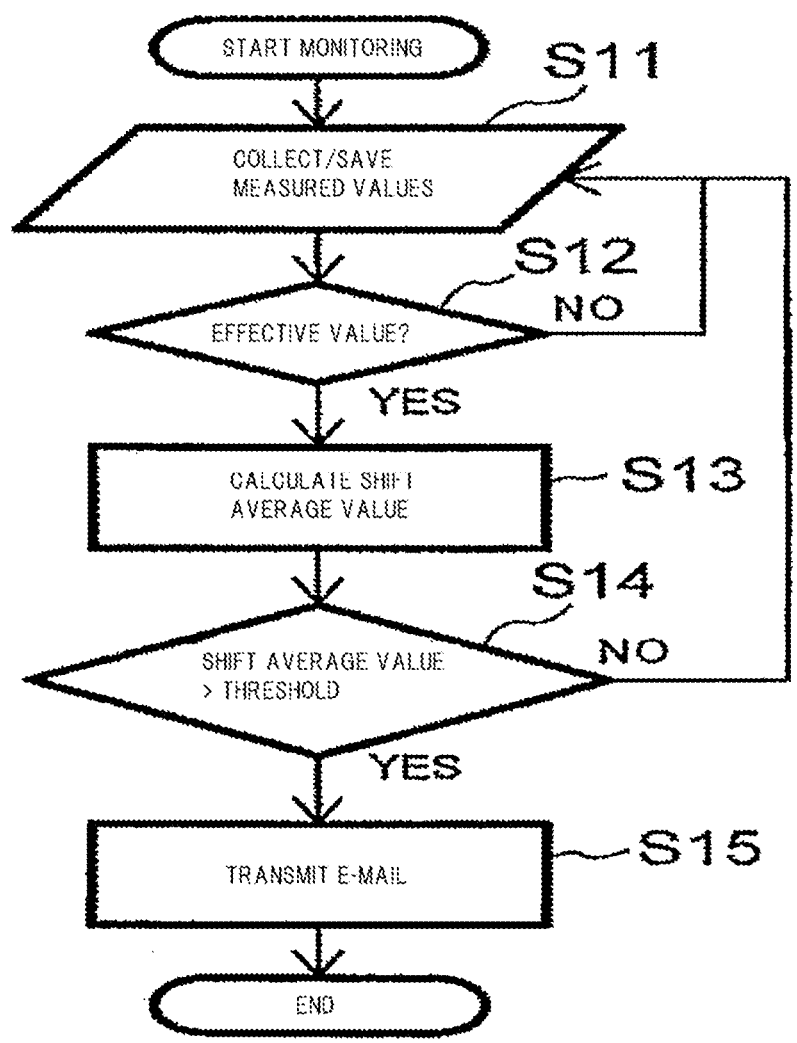
FIG. 4 is a flowchart showing a processing flow after start of monitoring in the remote assistant system of FIG. 1.

Next, processing after start of formal monitoring will be described in the order of a flow for determination by a moving average value of the vibration velocity and a flow for determination by a moving average value of the noise, with reference to a flow for preventive maintenance monitoring shown in FIG. 4. The moving average value here is obtained by acquiring data along time series and calculating an average value of the data in each certain cycle period. By a technique of monitoring transition of this moving average value, there is an advantage in being able to suppress an influence by abnormal data due to an external factor and grasp a dynamic trend with higher accuracy.

In the flow for determination by the moving average value of the vibration velocity, first, measured values of the vibration velocity are collected (data is received) and saved (S11). Next, it is determined by the cloud server 54 whether or not the measured value of the vibration velocity is an effective velocity value, namely whether or not it is within the range between the effective velocity upper limit and the effective velocity lower limit having been previously set (inputted in S3 of FIG. 3) (S12), and when the measured value of the vibration velocity is not within the range between the effective velocity upper limit and the effective velocity lower limit, the processing returns to the step of collecting and saving measured values (S11).

Further, when the measured value of the vibration velocity is within the range between the effective velocity upper limit and the effective velocity lower limit, the cloud server 54 employs that measured value as an effective velocity value, and calculates a moving average value (S13). The moving average value is calculated by use of the latest effective velocity value and a saved effective velocity value.

Next, it is determined whether or not the latest moving average value exceeds the velocity threshold having been previously set (decided in S9 of FIG. 3) (S14). Further, in the present embodiment, in this step, it is simultaneously determined whether or not the latest moving average value exceeds the previously set first and second management values of the vibration velocity.

When the latest moving average value does not exceed the velocity threshold, the processing returns to the step of collecting and saving measured values (S11). In contrast, when the latest moving average value exceeds the velocity threshold, the cloud server 54 transmits a warning e-mail to that effect to the previously set e-mail address (S15). Further, in the present embodiment, when the latest moving average value exceeds the first management value of the vibration velocity, the cloud server 54 transmits a warning e-mail to the effect that it has exceeded the first management value of the vibration velocity to the previously set e-mail address, and when the latest moving average value exceeds the second management value of the vibration velocity, the cloud server 54 transmits a warning e-mail to the effect that it has exceeded the second management value of the vibration velocity to the previously set e-mail address (S15).

In such a manner, the vibration velocity is measured at least a plurality of times (six times in the present embodiment) in one hour while an overall trend change is rapidly determined from only those measured values, and hence the cloud server 54 can transmit a warning e-mail at appropriate timing. Further, it is possible to transmit a warning e-mail at appropriate timing in accordance with an inspection level.

It is to be noted that, after transmission of the e-mail described above, the person in charge of sales or a person in charge of maintenance performs inspection and maintenance at the customer, and re-starts monitoring (monitoring in the flow of FIG. 4) by means of the moving average value of the vibration velocity.

Here, some description of the vibration velocity will be supplementary given: a composite element is reflected to a measured value of the vibration velocity, and a sum of a variety of vibration groups is measured. For example, in the case of the barrel polishing device 10 shown in FIG. 2, a measured value varies due to a variety of factors as in a case where the V-belt 28V as an expendable part is slipped or loosened by friction, a case where the shafts of the pulleys 28P, 28Q are decentered, a case where grease of the bearings 26 are insufficient, a case where the motor 30 has a problem, or some other case. For this reason, in the cloud server 54 (cf. FIG. 1) of the present embodiment, processing is performed by the logic of not making a determination based on a value of one measurement, but making a determination by taking a look at an overall trend change in measured value of the vibration velocity. Further, for example when unbalance occurs in the drive force transmission mechanism 28 caused by slipping of the V-belt 28V as the expendable part due to friction, it has an adverse influence on the motor 30, and hence in the present embodiment, a warning e-mail for inspection is transmitted before an adverse influence is exerted on the motor 30. Then, the expendable part and the like are monitored all the time and maintenance is performed at appropriate timing, thereby making it possible to efficiently suppress shortening of the life of the motor 30, and further contribute to long-term maintenance of the barrel polishing device 10.

Incidentally, for example when the vibration sensor unit is fixed to the vicinity of a rotary body to be monitored, vibration of a variety of vibration groups, chiefly vibration of a vibration group whose main cause is rotation, acts on the installation surface, and hence the vibration sensor unit measures a sum of such vibration. As the vibration group, there are a surrounding background vibration group, a sudden vibration group, a rotational vibration group generated on the rotary surface and a friction and sliding vibration group. The rotary surface is roughened due to friction along with the passage of time, and vibration increases due to a chip, a dent or the like. These increases and variations in vibration are monitored and diagnosed by the above method, thereby allowing grasping of trends thereof and management thereof.

Next, a flow for determination by the moving average value of the noise will be described. Also in the flow for determination by the moving average value of the noise, there is basically executed a similar step to the flow for determination by the moving average value of the vibration velocity. To describe it briefly while using FIG. 4, first, measured values of the noise are collected (data is received) and saved (S11). Next, it is determined by the cloud server 54 whether or not the measured value of the noise is an effective noise value, namely whether or not it is within the range between the effective noise upper limit and the effective noise lower limit having been previously set (cf. S3 of FIG. 3) (S12), and when the measured value of the noise is not within the range between the effective noise upper limit and the effective noise lower limit, the processing returns to the step of collecting and saving measured values (S11).

Further, when the measured value of the noise is within the range between the effective noise upper limit and the effective noise lower limit, the cloud server 54 employs that measured value as an effective noise value, and calculates a moving average value (S13). The moving average value is calculated by use of the latest effective noise value and a saved effective noise value.

Next, it is determined whether or not the latest moving average value exceeds the previously set noise threshold (cf. S9 of FIG. 3) (S14), and when the latest moving average value does not exceed the noise threshold, the processing returns to the step of collecting and saving measured values (S11). In contrast, when the latest moving average value exceeds the noise threshold, the cloud server 54 transmits a warning e-mail to that effect to the previously set e-mail address (S15).

In such a manner, the noise is measured at least a plurality of times (six times in the present embodiment) in one hour while an overall trend change is rapidly determined from only those measured values, and hence the cloud server 54 can transmit a warning e-mail regarding the noise at appropriate timing from a viewpoint different from the vibration velocity. In the case of the barrel polishing device 10 (cf. FIG. 2), since the vibration velocity and the noise are relevant to each other to a certain extent, the customer can obtain warning information regarding the noise as supplementary information for determining the vibration velocity.

It is to be noted that, after transmission of the warning e-mail, the person in charge of sales or the person in charge of maintenance performs inspection and maintenance at the customer according to the need, and re-starts monitoring (monitoring in the flow of FIG. 4) by means of the moving average value of the noise.

Next, with reference to FIGS. 5 and 6, a description will be given of monitor processing by the cloud server 54 (cf. FIG. 1) in a case where a part of the device is replaced, taking a case as one example where a part constituting the flowing mechanism 32 is replaced in the barrel polishing device 10 shown in FIG. 2.

The cloud server 54 shown in FIG. 1 determines an influence by the part replacement in a case where data of a replacement date of the part in the barrel polishing device 10 shown in FIG. 2 is inputted and at a point in time when a predetermined number of days have elapsed after the replacement date of the part.

Figure 5:
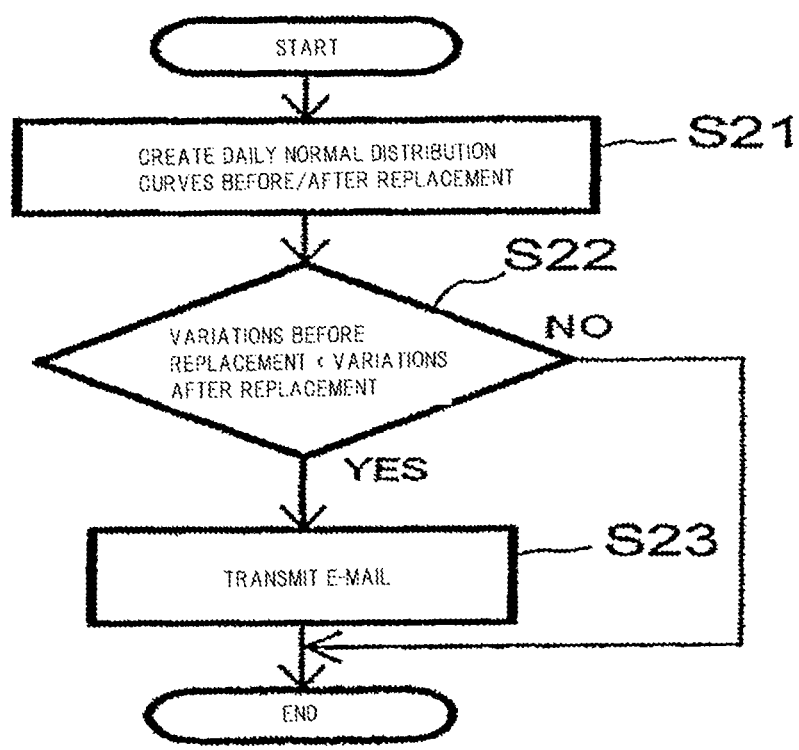
FIG. 5 is a flowchart showing a processing flow after start of monitoring and after part replacement in the remote assistant system of FIG. 1.

To describe it specifically, as shown in FIG. 5, first, the cloud server 54 creates daily normal distribution curves before and after the part replacement (S21). That is, daily normal distribution curves, plotted with the vibration velocity on a horizontal axis within a range of effective velocity values saved before the replacement date of the part, are created and taken as a plurality of first distribution curves. Further, daily normal distribution curves, plotted with the vibration velocity on a horizontal axis within a range of effective velocity values saved after the replacement date of the part, are created and taken as a plurality of second distribution curves.

FIG. 6(A) shows a graph where first distribution curves B1, B2, B3, B4, B5 (hereinafter referred to as "first distribution curves B1 to B5") in a plurality of numbers (for five days) are superimposed with the horizontal axis and a vertical axis made in common. Further, FIG. 6(B) shows a graph where second distribution curves A1, A2, A3, A4, A5 (hereinafter referred to as "second distribution curves A1 to A5") in a plurality of numbers (for five days) are superimposed with the horizontal axis and a vertical axis made in common. It is to be noted that in FIG. 6(A), reference character B1 denotes a distribution curve one day before the part replacement, reference character B2 denotes a distribution curve two days before the part replacement, reference character B3 denotes a distribution curve three days before the part replacement, reference character B4 denotes a distribution curve four days before the part replacement, and reference character B5 denotes a distribution curve five days before the part replacement. Further, in FIG. 6(B), reference character A1 denotes a distribution curve one day after the part replacement, reference character A2 denotes a distribution curve two days after the part replacement, reference character A3 denotes a distribution curve three days after the part replacement, reference character A4 denotes a distribution curve four days after the part replacement, and reference character A5 denotes a distribution curve five days after the part replacement.

Returning to the processing step of FIG. 5, next, it is determined by the cloud server 54 whether or not variations in vibration velocity after the part replacement are larger than variations in vibration velocity before the part replacement (S22). To describe it in more detail, it is determined whether or not variations in a horizontal axial direction in the case of superimposing the plurality of second distribution curves A1 to A5 with the horizontal axis and the vertical axis made in common shown in FIG. 6(B) are larger than variations in the horizontal axial direction in the case of superimposing the plurality of first distribution curves B1 to B5 with the horizontal axis and the vertical axis made in common shown in FIG. 6(A).

Figure 6:
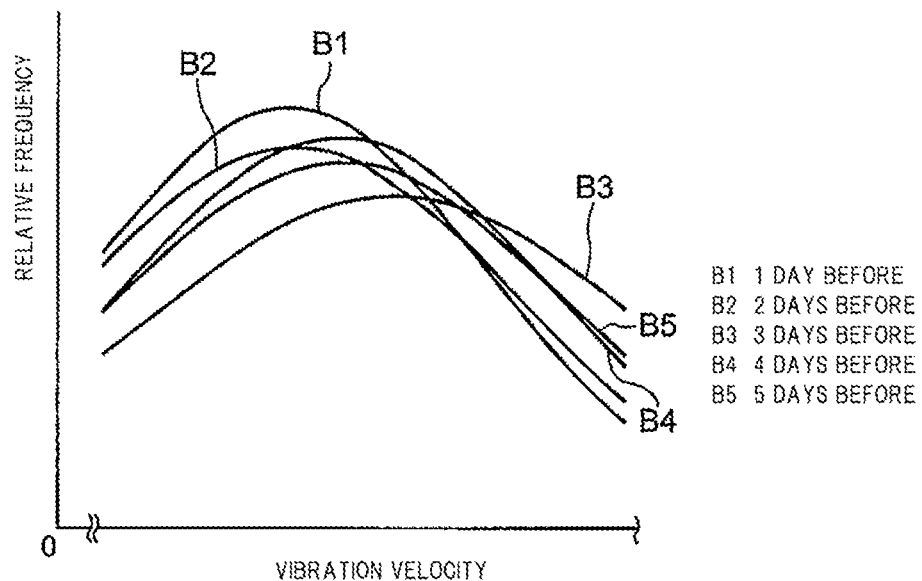
FIG. 6 shows examples of daily normal distribution curves before and after part replacement, where
Figure 6:
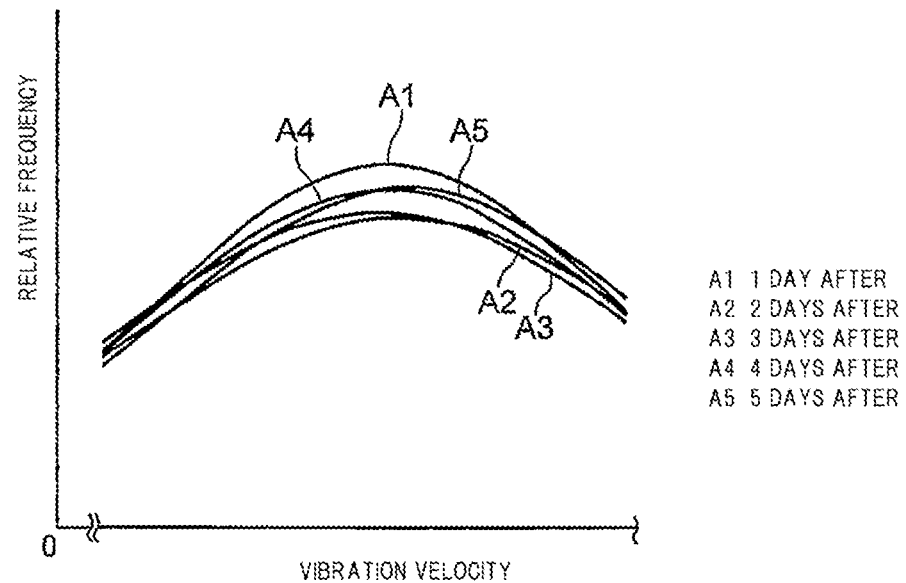

As shown in FIG. 6, when the variations in the horizontal axial direction in the case of superimposing the plurality of second distribution curves A1 to A5 with the horizontal axis and the vertical axis made in common are not larger than the variations in the horizontal axial direction in the case of superimposing the plurality of first distribution curves B1 to B5 with the horizontal axis and the vertical axis made in common, the processing is completed as shown in FIG. 5.

On the other hand, when determining that the variations in the horizontal axial direction in the case of superimposing the plurality of second distribution curves with the horizontal axis and the vertical axis made in common are larger than the variations in the horizontal axial direction in the case of superimposing the plurality of first distribution curves with the horizontal axis and the vertical axis made in common, the cloud server 54 transmits a warning e-mail (e-mail) to that effect to the previously set e-mail address (S23). Accordingly, when variations in vibration velocity become large due to part replacement, the cloud server 54 can transmit a warning e-mail at appropriate timing.

It should be noted that the cloud server 54 (cf. FIG. 1) superimposes and displays, on the web screen, the plurality of second distribution curves A1 to A5 shown in FIG. 6(B) and the plurality of first distribution curves B1 to B5 shown in FIG. 6(A) in a discernable manner by color-coding or the like and with the horizontal axis and the vertical axis made in common.

Next, with reference to FIGS. 7 and 8, a description will be given of prediction processing for the time for part replacement by the cloud server 54 shown in FIG. 1.

Figure 7:
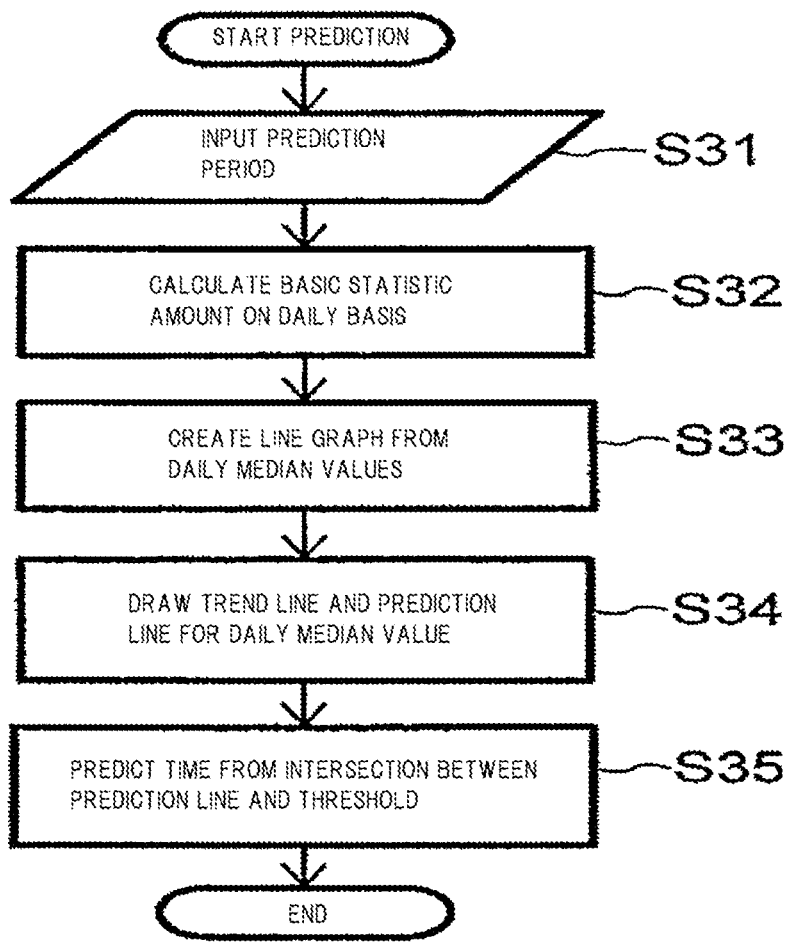
FIG. 7 is a flowchart showing a processing flow of predictive maintenance diagnosis in the remote assistant system of FIG. 1.
Figure 8:
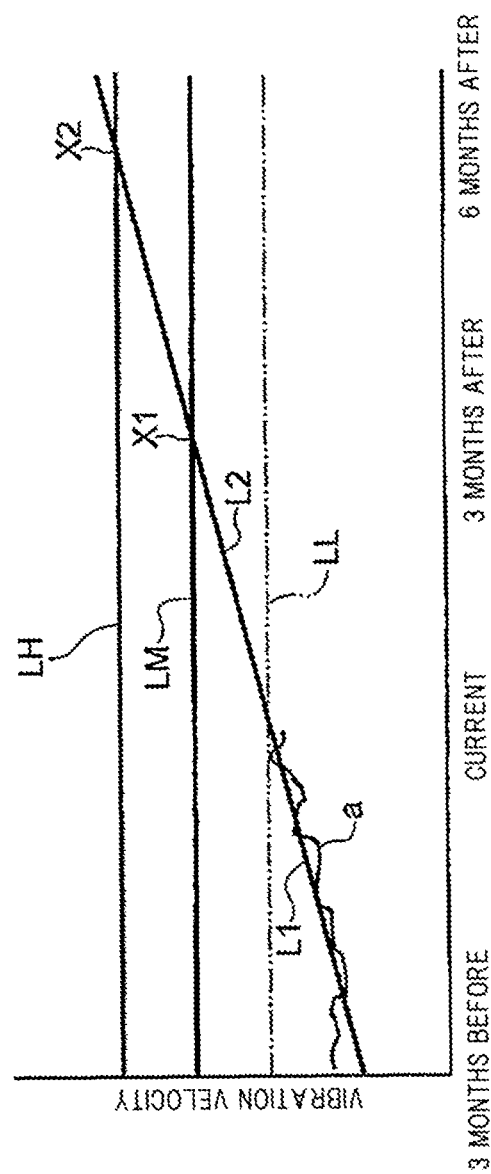
FIG. 8 is a correlation diagram for explaining prediction of the time for part replacement and the time for an overhaul of the device.

First, as shown in a predictive maintenance diagnosis flow of FIG. 7, the person in charge of management inputs a prediction period (six months as one example) from the input screen of the application software on the cloud server 54 (FIG. 1) (S31). Next, the cloud server 54 calculates a basic statistic amount on a daily basis within the range of the saved effective velocity values and calculates a daily median value (S32). It should be noted that the basic statistic amount on a daily basis may be automatically calculated each day by the cloud server 54 (cf. FIG. 1).

Next, the application software on the cloud server 54 (FIG. 1) creates a line graph for the daily median value (S33). FIG. 8 shows a correlation diagram showing a correlation between the vibration velocity (vertical axis) and a date (horizontal axis), and reference character a denotes the line graph for the daily median value. Next, in the correlation diagram showing the correlation between the vibration velocity and the date, a trend line L1 showing a trend of a change per day in daily median value is created, while the trend line L1 is extended to be taken as a prediction line L2 (S34 of FIG. 7).

Subsequently, in the correlation diagram of FIG. 8, the cloud server 54 predicts the time for part replacement from an intersection X1 between the prediction line L2 and a straight line LM showing a management threshold previously set as a vibration velocity at which part replacement is required in the barrel polishing device 10 (cf. FIG. 2) (S35 of FIG. 7). Hence it is possible to notify the customer in advance of the predicted time for part replacement. Further, in the correlation diagram of FIG. 8, the cloud server 54 predicts the time for an overhaul of the barrel polishing device 10 (cf. FIG. 2) from an intersection X2 between the prediction line L2 and a straight line LH showing a threshold for management previously set as a vibration velocity at which an overhaul of the barrel polishing device 10 (cf. FIG.

2) is required (S35 of FIG. 7). Hence it is possible to notify the customer in advance of the time for an overhaul that requires a plan and a preparation period.

It is to be noted that in the present embodiment, although the cloud server 54 predicts both of the predicted time for part replacement and the time for an overhaul of the barrel polishing device 10 (cf. FIG. 2), it may predict only either of them. Further, as shown in FIG. 8, the cloud server 54 can set a threshold, which is a smaller value than the above management threshold but requires attention, and draws a straight line LL showing this threshold, thereby to predict the time for start of attention from an intersection between the straight line LL and the prediction line L2.

As described above, according to the remote assistant system 40 shown in FIG. 1 and the like, it is possible to measure a vibration velocity and then determine whether or not warning is required, so as to notify warning to the customer or the like at appropriate timing.

(Supplementary Description of Embodiment)

It is to be noted that, although the case has been described in the above embodiment where the server for performing the monitor processing is the cloud server 54 shown in FIG. 1, the server for performing the monitor processing may be another server such as a server installed in the support center, for example.

Further, although the device to be monitored is the barrel polishing device 10 shown in FIG. 2 in the above embodiment, the device to be monitored may be another device such as the shot blaster or the dust collection machine 16.

Further, although the vibration sensor unit 42 is fixed to the barrel polishing device 10 in the above embodiment, the vibration sensor unit may be fixed to a periphery of the device to be monitored. Moreover, the vibration sensor unit may be fixed to the device to be monitored or a periphery thereof by means (e.g., bolt fastening) other than adsorption of the magnet. Furthermore, the noise sensor unit may be fixed to the housing 34 of the barrel polishing device 10 by means (e.g., bolt fastening) other than adsorption of the magnet.

Further, as a modified example of the above embodiment, for example, it may be configured such that the remote assistant system 40 is provided with a vibration velocity sensor for measuring a vibration velocity, a noise sensor for measuring noise and a temperature sensor for measuring a temperature, and a sensor unit, which transmits information of a measured value measured in each of the sensors at least a plurality of times in one hour at predetermined time intervals, is fixed to the device or a periphery thereof, while the server receives and saves the information of the measured values. It should be noted that the sensor unit is an element a portion of which is grasped as a vibration sensor unit, a portion of which is grasped as a noise sensor unit, and a portion of which is grasped as a temperature sensor unit.

Further, although the management value of the vibration velocity has been set in addition to the velocity threshold in the above embodiment, it is possible to only set the velocity threshold without setting the management value of the vibration velocity.

Moreover, although the vibration sensor unit 42 has transmitted the information of the measured value of the vibration velocity six times in one hour in the above embodiment, the information of the measured value of the vibration velocity may be transmitted by the vibration sensor unit other than six times, such as twice to five times or ten times, in one hour. Similarly, although the noise sensor unit 48 has transmitted the information of the measured value of the noise six times in one hour in the above embodiment, the information of the measured value of the noise may be transmitted by the noise sensor unit other than six times, such as twice to five times or ten times, in one hour.

Further, as a modified example of the above embodiment, the server may be a server with the logic of the processing flow of FIG. 5 not stored in a storage section, or may be a server with the logic of the processing flow of FIG. 7 not stored in a storage section.

The above embodiment and the plurality of modified examples described above can be implemented in appropriate combination.

Although one example of the present invention has been described above, the present invention is not restricted to the above, and can naturally be implemented with a variety of modifications within a scope not deviating from the gist thereof.

Summary of Embodiment

A remote assistant system of the first embodiment of the present invention has: a vibration sensor unit which is fixed to a device to be monitored or a periphery thereof and measures a vibration velocity, while transmitting information of a measured value of the measurement at least a plurality of times in one hour at predetermined time intervals; and a server which receives and saves the information of the measured value transmitted from the vibration sensor unit, while employing as an effective velocity value only a measured value within a range between an effective upper-limit velocity value and an effective lower-limit velocity value previously set as a velocity range of vibration caused by operation of the device, and transmits a warning e-mail to a previously set e-mail address when the latest moving average value calculated by use of the latest effective velocity value and a saved effective velocity value exceeds a velocity threshold previously set as an upper limit for a vibration velocity in a case not requiring inspection, the warning e-mail being transmitted to that effect.

According to the above configuration, a vibration sensor unit fixed to a device to be monitored or a periphery thereof measures a vibration velocity, while transmitting information of a measured value of the measurement at least a plurality of times in one hour at predetermined time intervals. In contrast, a server receives and saves the information of the measured value transmitted from the vibration sensor unit, while employing as an effective velocity value only a measured value within a range between an effective upper-limit velocity value and an effective lower-limit velocity value previously set as a velocity range of vibration caused by operation of the device. Then, when the latest moving average value calculated by use of the latest effective velocity value and a saved effective velocity value exceeds a velocity threshold previously set as an upper limit for a vibration velocity in the case not requiring inspection, the server transmits a warning e-mail to that effect to a previously set e-mail address. In such a manner, the vibration velocity is measured at least a plurality of times in one hour while an overall trend change is rapidly determined from only those measured values, thereby allowing transmission of a warning e-mail at appropriate timing.

In the remote assistant system of the second embodiment of the present invention, with the configuration of the first embodiment, when the latest moving average value exceeds a management value of the vibration velocity that is a larger value than the velocity threshold and is previously set in accordance with an inspection level of the device, the server transmits a warning e-mail to that effect to the previously set e-mail address.

According to the above configuration, when the latest moving average value exceeds a previously set management value of the vibration velocity, the server transmits a warning e-mail to that effect to the previously set e-mail address. The previously set management value of the vibration velocity is a larger value than the velocity threshold and is set in accordance with an inspection level of the device. Hence, it is possible to transmit a warning e-mail at appropriate timing in accordance with the inspection level. It is to be noted that the inspection level is a level on which inspection is to be performed.

In the remote assistant system of the third embodiment of the present invention, with the configuration of the first embodiment, in a case where data of a replacement date of a part in the device is inputted and at a point in time when a predetermined number of days have elapsed after the replacement date of the part, the server creates daily normal distribution curves, plotted with the vibration velocity on a horizontal axis within a range of effective velocity values saved before the replacement date of the part, and takes the created curves as a plurality of first distribution curves, while creating daily normal distribution curves, plotted with the vibration velocity on the horizontal axis within a range of effective velocity values saved after the replacement date of the part, and taking the created curves as a plurality of second distribution curves, and transmits a warning e-mail to the previously set e-mail address when determining that variations in a horizontal axial direction in the case of superimposing the plurality of second distribution curves with the horizontal axis and a vertical axis made in common are larger than variations in the horizontal axial direction in the case of superimposing the plurality of first distribution curves with the horizontal axis and a vertical axis made in common, the warning e-mail being transmitted to that effect.

In the remote assistant system of the fourth embodiment of the present invention, with the configuration of the second embodiment, in a case where data of a replacement date of a part in the device is inputted and at a point in time when a predetermined number of days have elapsed after the replacement date of the part, the server creates daily normal distribution curves, plotted with the vibration velocity on a horizontal axis within a range of effective velocity values saved before the replacement date of the part, and takes the created curves as a plurality of first distribution curves, while creating daily normal distribution curves, plotted with the vibration velocity on the horizontal axis within a range of effective velocity values saved after the replacement date of the part, and taking the created curves as a plurality of second distribution curves, and transmits a warning e-mail to the previously set e-mail address when determining that variations in a horizontal axial direction in the case of superimposing the plurality of second distribution curves with the horizontal axis and a vertical axis made in common are larger than variations in the horizontal axial direction in the case of superimposing the plurality of first distribution curves with the horizontal axis and a vertical axis made in common, the warning e-mail being transmitted to that effect.

According to the above configuration, the server creates a plurality of distribution curves in a case where data of a replacement date of a part in the device is inputted and at a point in time when a predetermined number of days have elapsed after the replacement date of the part. That is, the server creates daily normal distribution curves, plotted with the vibration velocity on a horizontal axis within a range of effective velocity values saved before the replacement date of the part, and takes the created curves as a plurality of first distribution curves, while creating daily normal distribution curves, plotted with the vibration velocity on the horizontal axis within a range of effective velocity values saved after the replacement date of the part, and taking the created curves as a plurality of second distribution curves. Then, when the server determines that the variations in the horizontal axial direction in the case of superimposing the plurality of second distribution curves with the horizontal axis and the vertical axis in common are larger than the variations in the horizontal axial direction in the case of superimposing the plurality of first distribution curves with the horizontal axis and the vertical axis made in common, the server transmits a warning e-mail to that effect to the previously set e-mail address. Accordingly, when the variations in vibration velocity become large due to part replacement, it is possible to transmit a warning e-mail at appropriate timing.

In the remote assistant system of the fifth embodiment of the present invention, with the configuration of any one of the first to fourth embodiments, the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for part replacement from an intersection between the prediction line and a straight line showing a management threshold previously set as a vibration velocity at which part replacement is required in the device.

According to the above configuration, the server calculates a daily median value within a range of the saved effective velocity values, and creates a trend line showing a trend of a change per day in median value, while extending the trend line and taking the extended line as a prediction line, in a correlation diagram showing a correlation between the vibration velocity and a date. Then, in the correlation diagram, the server predicts the time for part replacement from an intersection between the prediction line and a straight line showing a management threshold previously set as a vibration velocity at which part replacement is required in the device. Hence it is possible to notify the customer in advance of the predicted time for part replacement.

In the remote assistant system of the sixth embodiment of the present invention, with the configuration of any one of the first to fourth embodiments, the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for an overhaul of the device from an intersection between the prediction line and a straight line showing a threshold for management, previously set as a vibration velocity at which an overhaul of the device is required.

According to the above configuration, the server calculates a daily median value within a range of the saved effective velocity values, and creates a trend line showing a trend of a change per day in median value, while extending the trend line and taking the extended line as a prediction line, in a correlation diagram showing a correlation between the vibration velocity and a date. Then, in the correlation diagram, the server predicts the time for an overhaul of the device from an intersection between the prediction line and a straight line showing a threshold for management previously set as a vibration velocity at which an overhaul of the device is required. Hence it is possible to notify the customer in advance of the time for an overhaul of the device.

In the remote assistant system of the seventh embodiment of the present invention, with the configuration of any one of the first to fourth embodiments, the device is a barrel polishing device that includes a polishing container into which a media and a workpiece are mounted, a flowing mechanism which allows the media and the workpiece mounted into the polishing container to flow, and a housing which is housed with the polishing container while being provided separately from the outer surface of the polishing container, the vibration sensor unit is fixed to the outer surface of the polishing container, a noise sensor unit, which is fixed to the housing and measures noise while transmitting information of a measured value of the measurement at least a plurality of times in one hour at predetermined time intervals, is provided, and the server receives and saves the information of the measured value transmitted from the noise sensor unit, while employing as an effective noise value only a measured value within a range between an effective noise upper limit and an effective noise lower limit previously set as a range of noise caused by operation of the device, and transmits a warning e-mail to the previously set e-mail address when the latest moving average value calculated by use of the latest effective noise value and a saved effective noise value exceeds a noise threshold previously set as an upper limit for noise in a case not requiring inspection, the warning e-mail being transmitted to that effect.

According to the above configuration, the device to be monitored is a barrel polishing device that includes a polishing container into which a media and a workpiece are mounted, a flowing mechanism which allows the media and the workpiece mounted into the polishing container to flow, and a housing which is housed with the polishing container while being provided separately from the outer surface of the polishing container. In contrast, since the vibration sensor unit is fixed to the outer surface of the polishing container, it can favorably measure a velocity of vibration generated due to operation of the flowing mechanism.

Meanwhile, a noise sensor unit which measures noise is fixed to the housing provided separately from the outer surface of the polishing container. In the position of the outer surface of the polishing container, a case may occur where noise is so large that a noise value cannot be measured, but in the position of the housing, such a case basically does not occur, and hence the noise sensor unit can favorably measure noise generated due to operation of the flowing mechanism. The noise sensor unit transmits information of a measured value of the measurement at least a plurality of times in one hour at predetermined time intervals, and the server receives and saves the information of the measured value transmitted from the vibration sensor unit. The server then employs as an effective noise value only a measured value within a range between an effective noise upper limit and an effective noise lower limit previously set as a range of noise caused by operation of the device, and transmits a warning e-mail to the previously set e-mail address when the latest moving average value calculated by use of the latest effective noise value and a saved effective noise value exceeds a noise threshold previously set as an upper limit for noise in the case not requiring inspection, the warning e-mail being transmitted to that effect.

In such a manner, the noise is measured a plurality of times in one hour while an overall trend change is rapidly determined from only those measured values, thereby allowing transmission of a warning e-mail regarding the noise at appropriate timing from a viewpoint different from the vibration velocity. In the case of the barrel polishing device, since the vibration velocity and the noise are relevant to each other to a certain extent, the user can obtain warning information regarding the noise as supplementary information for determining the vibration velocity.

In the remote assistant system of the eighth embodiment of the present invention, with the configuration of any one of the first to fourth embodiments, the vibration sensor unit includes a casing and a magnet fitted to the outer surface of the casing, and the vibration sensor unit is detachably fixed to the device or a periphery thereof by means of the magnet.

According to the above configuration, the vibration sensor unit can be readily attached to and detached from the device or a periphery thereof by the magnet fitted to the outer surface of the casing.

In the remote assistant system of the ninth embodiment of the present invention, with the configuration of the seventh embodiment, the noise sensor unit includes a casing section and a magnet section fitted to the outer surface of the casing section, and is detachably fixed to the housing by means of the magnet section.

According to the above configuration, the noise sensor unit can be readily attached to and detached from the housing by the magnet section fitted to the outer surface of the casing section.

A method for remote assistance of the tenth embodiment of the present invention includes: measuring a vibration velocity, while transmitting information of a measured value of the measurement at least a plurality of times in one hour at predetermined time intervals, by a vibration sensor unit fixed to a device to be monitored or to a periphery thereof; and receiving and saving the information of the measured value transmitted from the vibration sensor unit, while employing as an effective velocity value only a measured value within a range between an effective upper-limit velocity value and an effective lower-limit velocity value previously set as a velocity range of vibration caused by operation of the device, and transmitting a warning e-mail to a previously set e-mail address when the latest moving average value calculated by use of the latest effective velocity value and the saved effective velocity value exceeds a velocity threshold previously set as an upper limit for a vibration velocity in a case not requiring inspection, the warning e-mail being transmitted to that effect.

In such a manner, the vibration velocity is measured at least a plurality of times in one hour while an overall trend change is rapidly determined from only those measured values, thereby allowing transmission of a warning e-mail at appropriate timing.

As described above, according to the remote assistant system of one embodiment of the present invention, it is possible to measure a vibration velocity and then determine whether or not warning is required, so as to notify warning to the customer or the like at appropriate timing.

REFERENCE SIGNS LIST

10 barrel polishing device (device)
12 barrel container (polishing container)
32 flowing mechanism
34 housing
40 remote assistant system
42 vibration sensor unit
42B casing 42M magnet
48 noise sensor unit
48B casing section
48M magnet section
54 cloud server (server)
A1, A2, A3, A4, A5 second distribution curve
B1, B2, B3, B4, B5 first distribution curve
L1 trend line
L2 prediction line
LH straight line showing threshold for management
LM straight line showing management threshold
M media
W workpiece

The invention claimed is:

1. A remote assistant system, comprising:
a vibration sensor unit which is fixed to a device to be monitored or a periphery thereof and measures a vibration velocity, while transmitting information of a measured value of the measurement at least a plurality of times in one hour at predetermined time intervals, the vibration sensor unit including a casing and a magnet fitted to an outer surface of the casing, the vibration sensor unit being detachably fixed to the device or a periphery thereof by a magnet; and
a server which receives and saves the information of the measured value transmitted from the vibration sensor unit, while employing as an effective velocity value only a measured value within a range between an effective upper-limit velocity value and an effective lower-limit velocity value previously set as a velocity range of vibration caused by operation of the device, and transmits a warning e-mail to a previously set e-mail address when a latest moving average value calculated by use of a latest effective velocity value and a saved effective velocity value exceeds a velocity threshold previously set as an upper limit for a vibration velocity in a case not requiring inspection, the warning e-mail transmitted to a previously set e-mail address such that a part is subsequently replaced, wherein,
in a case where data of a replacement date of the part in the device is inputted and at a point in time when a predetermined number of days have elapsed after the replacement date of the part,
the server
creates daily distribution curves, plotted with the vibration velocity on a horizontal axis within a range of effective velocity values saved before the replacement date of the part, and takes the created curves as a plurality of first distribution curves, and superimposes the plurality of first distribution curves with the horizontal axis and a vertical axis made in common,
while creating daily distribution curves, plotted with the vibration velocity on the horizontal axis within a range of effective velocity values saved after the replacement date of the part, and taking the created curves as a plurality of second distribution curves, and superimposes the plurality of second distribution curves with the horizontal axis and the vertical axis made in common, and
transmits the warning e-mail to the previously set e-mail address when determining that variations in a horizontal axial direction in the superimposed second distribution curves are larger than variations in the horizontal axial direction in the superimposed first distribution curves, the warning e-mail being transmitted to that effect.

2. The remote assistant system according to claim 1, wherein, when the latest moving average value exceeds a management value of the vibration velocity that is a larger value than the velocity threshold and is previously set in accordance with an inspection level of the device, the server transmits a warning e-mail to that effect to the previously set e-mail address.

3. The remote assistant system according to claim 1, wherein the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for part replacement from an intersection between the prediction line and a straight line showing a management threshold previously set as a vibration velocity at which part replacement is required in the device.

4. The remote assistant system according to claim 1, wherein the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for an overhaul of the device from an intersection between the prediction line and a straight line showing a threshold for management, previously set as a vibration velocity at which an overhaul of the device is required.

5. The remote assistant system according to claim 1, wherein the device is a barrel polishing device that includes a polishing container into which a media and a workpiece are mounted, a flowing mechanism which allows the media and the workpiece mounted into the polishing container to flow, and a housing which is housed with the polishing container while being provided separately from the outer surface of the polishing container,
the vibration sensor unit is fixed to the outer surface of the polishing container,
a noise sensor unit, which is fixed to the housing and measures noise while transmitting information of a measured value of the measurement at least a plurality of times in one hour at predetermined time intervals, is provided, and
the server receives and saves the information of the measured value transmitted from the noise sensor unit, while employing as an effective noise value only a measured value within a range between an effective noise upper limit and an effective noise lower limit previously set as a range of noise caused by operation of the device, and transmits a warning e-mail to the previously set e-mail address when the latest moving average value calculated by use of a latest effective noise value and a saved effective noise value exceeds a noise threshold previously set as an upper limit for noise in a case not requiring inspection, the warning e-mail being transmitted to that effect.

6. The remote assistant system according to claim 5, wherein the noise sensor unit comprises a casing section and a magnet section fitted to the outer surface of the casing section, the noise sensor unit being detachably fixed to the housing by means of the magnet section.

7. A remote assistant system, comprising:
a vibration sensor unit fixed to a device to be monitored, the vibration sensor unit configured to measure a vibration velocity of the device to be monitored and to transmit a measured velocity value of the vibration velocity at predetermined time intervals; and
a server configured to receive and save the measured velocity values transmitted from the vibration sensor unit, to employ as an effective velocity value only a measured velocity value within a range between an effective upper-limit velocity value and an effective lower-limit velocity value previously set as a velocity range of vibration caused by operation of the device, to generate a warning e-mail when a latest moving average value calculated by use of a latest effective velocity value and a saved effective velocity value exceeds a velocity threshold previously set as an upper limit for a vibration velocity in a case not requiring inspection, and to transmit the warning e-mail to a previously set e-mail address such that a part is subsequently replaced, wherein,
in a case where data of a replacement date of the part in the device is inputted and at a point in time when a predetermined number of days have elapsed after the replacement date of the part,
the server
creates daily distribution curves, plotted with the vibration velocity on a horizontal axis within a range of effective velocity values saved before the replacement date of the part, and takes the created curves as a plurality of first distribution curves, and superimposes the plurality of first distribution curves with the horizontal axis and a vertical axis made in common,
while creating daily distribution curves, plotted with the vibration velocity on the horizontal axis within a range of effective velocity values saved after the replacement date of the part, and taking the created curves as a plurality of second distribution curves, and superimposes the plurality of second distribution curves with the horizontal axis and the vertical axis made in common, and
transmits the warning e-mail to the previously set e-mail address when determining that variations in a horizontal axial direction in the superimposed second distribution curves are larger than variations in the horizontal axial direction in the superimposed first distribution curves, the warning e-mail being transmitted to that effect.

8. The remote assistant system according to claim 7, wherein, when the latest moving average value exceeds a management value of the vibration velocity that is a larger value than the velocity threshold and is previously set in accordance with an inspection level of the device, the server transmits a warning e-mail to that effect to the previously set e-mail address.

9. The remote assistant system according to claim 7, wherein the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for part replacement from an intersection between the prediction line and a straight line showing a management threshold previously set as a vibration velocity at which part replacement is required in the device.

10. The remote assistant system according to claim 7, wherein the server calculates a daily median value within a range of the saved effective velocity values, creates a trend line showing a trend of a change per day in median value, while extending the trend line and taking the extended line as a prediction line, in a correlation diagram showing a correlation between the vibration velocity and a date, and predicts the time for an overhaul of the device from an intersection between the prediction line and a straight line showing a threshold for management, previously set as a vibration velocity at which an overhaul of the device is required.

11. The remote assistant system according to claim 7, wherein the device is a barrel polishing device including:
a polishing container configured to have a media disposed therein and a workpiece mounted therein, a flowing mechanism configured to allow the media to flow about the mounted workpiece, and a housing configured to house the polishing container separate from an outer surface of the polishing container;
the vibration sensor unit is fixed to the outer surface of the polishing container; and
a noise sensor unit fixed to the housing and configured to measure and transmit a measured noise value at predetermined time intervals,
wherein the server is configured to receive and save the measured noise values transmitted from the noise sensor unit, to employ an effective noise value only when the measured noise value is within a range between an effective noise upper limit and an effective noise lower limit previously set as a range of noise caused by operation of the device, and to transmits a warning e-mail to the previously set e-mail address when the latest moving average value calculated by use of a latest effective noise value and a saved effective noise value exceeds a noise threshold previously set as an upper limit for noise in a case not requiring inspection, the warning e-mail being transmitted to that effect.

12. The remote assistant system according to claim 11, wherein the noise sensor unit includes a casing section and a magnet section fitted to the outer surface of the casing section, the noise sensor unit being detachably fixed to the housing by the magnet section.

* * * * *